United States Patent [19]
Schmidt et al.

[11] Patent Number: 5,267,829
[45] Date of Patent: Dec. 7, 1993

[54] FLOW CONTROL APPARATUS FOR A TURBOCHARGER TURBINE

[75] Inventors: Erwin Schmidt, Baltmannsweiler; Wolfgang Treutlein, Kirchheim; Gerhard Fränkle, Remshalden; Thomas Schmitt, Leutenbach, all of Fed. Rep. of Germany

[73] Assignee: Mercedes Benz A.G., Stuttgart, Fed. Rep. of Germany

[21] Appl. No.: 23,389

[22] Filed: Feb. 26, 1993

[30] Foreign Application Priority Data

Mar. 14, 1992 [DE] Fed. Rep. of Germany ....... 4208264

[51] Int. Cl.$^5$ ............................................. F01D 1/08
[52] U.S. Cl. ......................................... 415/48; 415/157
[58] Field of Search ................. 415/47, 48, 49, 150, 415/151, 157, 158

[56] References Cited

U.S. PATENT DOCUMENTS

| | | | |
|---|---|---|---|
| 2,861,774 | 11/1958 | Buchi | 415/158 |
| 3,071,347 | 1/1963 | Schinnerer | 415/158 |
| 3,124,931 | 3/1964 | Mock | 415/150 |
| 3,749,513 | 7/1973 | Chute | 415/158 |
| 4,179,247 | 12/1979 | Osborne | . |
| 4,492,520 | 1/1985 | Marchand | . |
| 4,714,407 | 12/1987 | Cox et al. | . |
| 5,214,920 | 6/1993 | Leaveley | 415/158 |

FOREIGN PATENT DOCUMENTS

| | | | |
|---|---|---|---|
| 655017 | 1/1963 | Canada | 415/49 |
| 1011671 | 7/1957 | Fed. Rep. of Germany | . |
| 2633587 | 2/1978 | Fed. Rep. of Germany | . |
| 2843202 | 4/1980 | Fed. Rep. of Germany | . |
| 986680 | 8/1951 | France | 415/157 |

*Primary Examiner*—John T. Kwon
*Attorney, Agent, or Firm*—Klaus J. Bach

[57] ABSTRACT

In a flow control apparatus of an exhaust gas turbocharger turbine for an internal combustion engine including a rotor disposed in a turbine casing having a spiral guide channel arranged around the rotor with a mouth area defining an inlet opening for directing the exhaust gas to the turbine rotor, a control sleeve including a flow guide section with flow guide passage is axially movably supported between the spiral guide channel and the rotor. The flow guide passages have guide characteristics which vary depending on the axial location on the sleeve so that the characteristics of the exhaust gas flow admitted to the rotor can be changed by axial movement of the control sleeve. Adjacent the flow guide passages the control sleeve has an integral annular end section for blocking the exhaust gas flow so as to form a flow-throttling cross-section at the mouth area for engine brake operation.

10 Claims, 4 Drawing Sheets

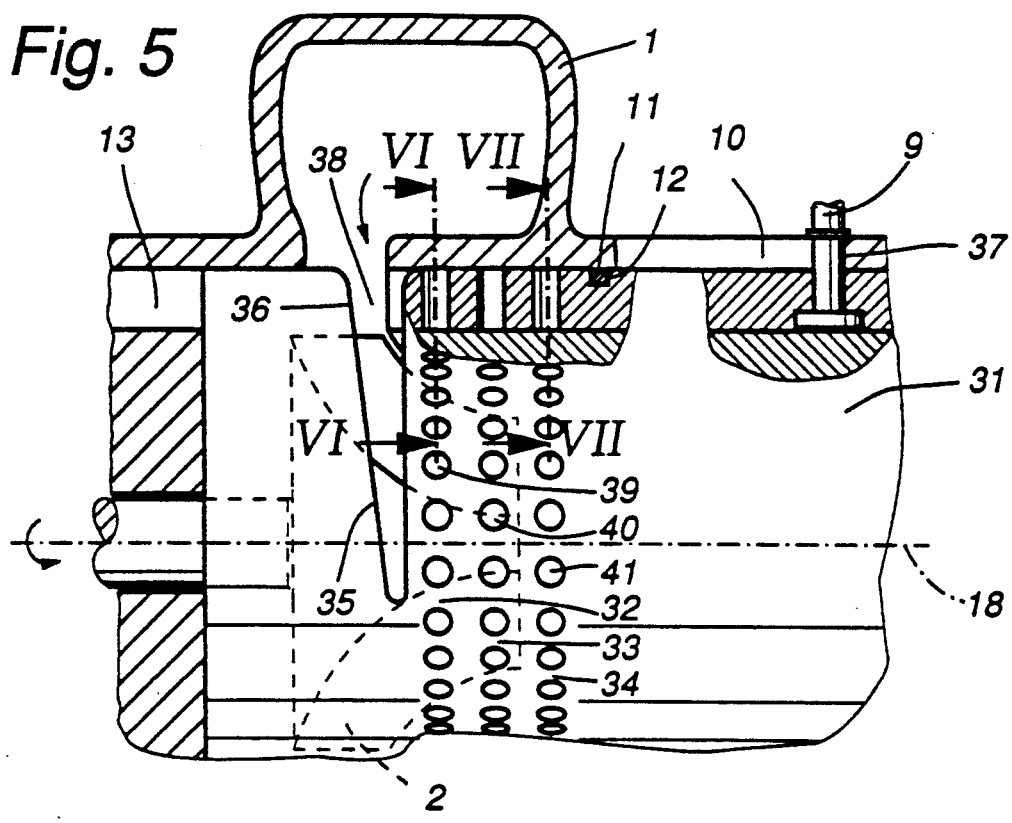
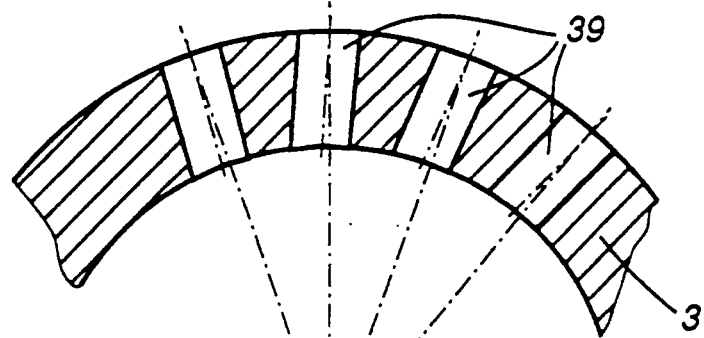
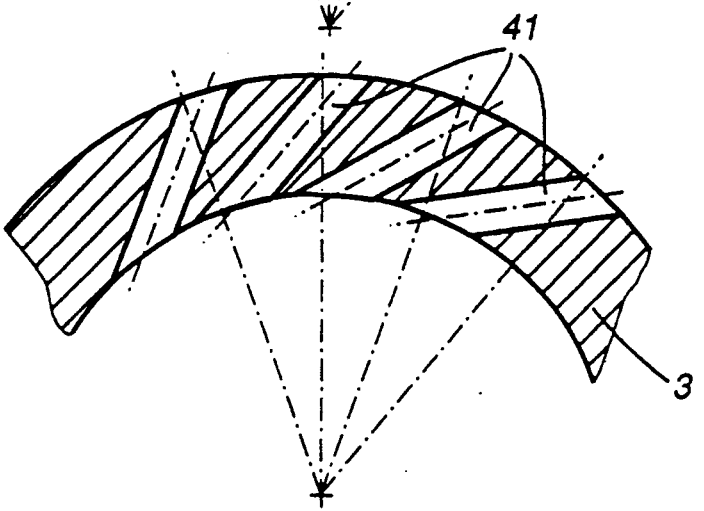

FLOW CONTROL APPARATUS FOR A TURBOCHARGER TURBINE

BACKGROUND OF THE INVENTION

The invention relates to flow control apparatus for the turbine of a turbocharger of an internal combustion engine.

DE-OS 28 43 202 already discloses an exhaust gas turbocharger for an internal combustion engine which has a radial turbine rotor surrounded by a spiral guide channel. Between the guide channel and the radial turbine wheel there is disposed an axially fixed annular partition, which has, distributed over its periphery, nozzle-like apertures which are inclined with respect to the tangential direction of the turbine rotor toward the axis of the turbine rotor. Around the annular partition there is disposed a diaphragm which is displaceable in the peripheral direction such that the cross-section of the nozzle-like apertures can be adjusted.

In addition, DE-AS 1 011 671 discloses an adjustable flow guide apparatus for a radial turbomachine wherein gases are fed via an adjustable guide grid to a turbine rotor (radial turbine). The adjustable guide grid consists of a plurality of guide vane rings of different dimensions and/or shapes, disposed one behind the other, and axially movable and manually adjustable.

Furthermore, DE-OS 26 33 587 discloses a tubular sliding device arranged between a dual-flow casing and a rotor of an exhaust gas turbocharger of an internal combustion engine. Regulation in the part-load range is achieved here by load-dependent closing of one flow passage. The highest permissible boost pressure is limited by a bypass slide valve.

U.S. Pat. No. 4,492,520 shows a gas turbine-driven motor vehicle having a radial turbine which is provided with an adjustable guide grid which has a plurality of guide vane rings of different configurations and whose axial adjustment can be effected in dependence on operating parameters of the engine.

With the known adjustable flow guide apparatus in the form of guide grids which do not permit to cover the vanes by means of a shield, a separate engine brake device must be installed because, with guide vane rings disposed axially behind one another, as disclosed in known prior art, a suitable throttle cross-section via positioning of the flow guide apparatus cannot be obtained.

In addition, adjustable flow guide apparatus of the known type, which are provided with guide vanes, have the disadvantage that only stepwise control of the approach flow direction with respect to the rotor is possible, so that optimum operation of the turbomachine can be achieved only at certain operating points. It is true that continuous control of mass flow by means of an azimuthally displaceable diaphragm mechanism is known, but such an arrangement complicates the design of the flow guide apparatus because of the larger number of movable parts.

It is the object of the invention to provide a flow guide apparatus for a turbocharger which is extremely simple in comparison with known flow apparatuses and yet does not have the above-mentioned disadvantages of the prior art.

SUMMARY OF THE INVENTION

A flow control apparatus of an exhaust gas turbocharger turbine for an internal combustion engine, which includes a rotor disposed in a turbine casing having a spiral guide channel arranged around the rotor with a mouth area defining an inlet for directing the exhaust gas to the turbine rotor comprises a control sleeve which is axially movably supported between the spiral guide channel and the rotor and has a flow guide section with flow guide passages that have varying guide characteristics depending on their axial location on the sleeve so that the characteristics of the exhaust gas flow admitted to the rotor can be changed by axial movement of the control sleeve relative to the guide channel mouth area. Adjacent the flow guide passages the control sleeve includes an integral annular end section for blocking the exhaust gas flow by forming a flow-throttling cross-section at the mouth area for engine brake operation.

With the arrangement according to the invention, a substantial simplification of the construction in comparison with previously known solutions is achieved because the end section of the control sleeve is an integral part of, and movable with, the control sleeve.

With such a control flow apparatus, continuous optimum control of the turbocharger for every load point, even for engine braking operation, is achieved. Continuous variation of the guide vane angle is achieved by movement of the twisted vanes. For engine braking operation the vanes are moved out of the flow and the tubular end of the sleeve is almost fully moved over the rotor. Problems concerning the strength of the vanes can thus be avoided even at high back pressures.

A change of the vane angle with varying width of the vane profile is obtained if the vanes are only further tilted but the radius of curvature of the median line of the vane remains the same over the vane length. Such an arrangement also accommodates a large mass flow since a large flow cross-section is available in the trapezoidally tapering vane tip region.

It is also possible for a fixed part of the guide vanes to be integrated into the spiral of the exhaust gas turbocharger with the movable part of the guide vanes forming a continuous extension of the fixed part of the guide vanes. In this case different radii of curvature of the guide vane parts may be provided, for which reason this embodiment also provides for greater flexibility of design.

The embodiment of the invention is a particularly inexpensive variation of the manufacture of the flow control sleeve since the apertures can, for example, be formed by providing oblique bores in a tubular body.

If the control sleeve is provided with a piston, simple hydraulic control of the flow control apparatus is achievable.

The flow control sleeve can be adjusted depending on operating parameters of an internal combustion engine by means of a pneumatic, hydraulic or electrical actuator. The internal combustion engine may thereby be operated under optimum conditions, particularly during acceleration and when operating under full load at low engine speeds.

Movement of the control sleeve toward the end position provides for the formation of the brake gap for engine brake operation by limiting the inlet cross-section of the flow control apparatus. In its end position only a small flow-throttling cross-section as needed for engine brake operation remains open. Consequently no separate engine brake device is required.

BRIEF DESCRIPTION OF THE DRAWINGS

The invention is explained more fully on the basis of an exhaust gas turbocharger of an internal combustion engine with reference to the drawings, in which:

FIG. 5 shows a control sleeve with rows of holes, disposed axially adjacent one another with the sleeve also providing for a brake gap;

FIG. 6 is a cross-sectional view taken along line VI—VI of FIG. 5 and showing a row of bores which are relatively slightly inclined in relation to the radial direction of the control sleeve; and FIG. 7 is a section similar to FIG. 6 taken along line VII—VII of FIG. 5 with bores which are considerably inclined in relation to the radial direction of the flow control apparatus.

DESCRIPTION OF THE PREFERRED EMBODIMENTS

Figure 1:
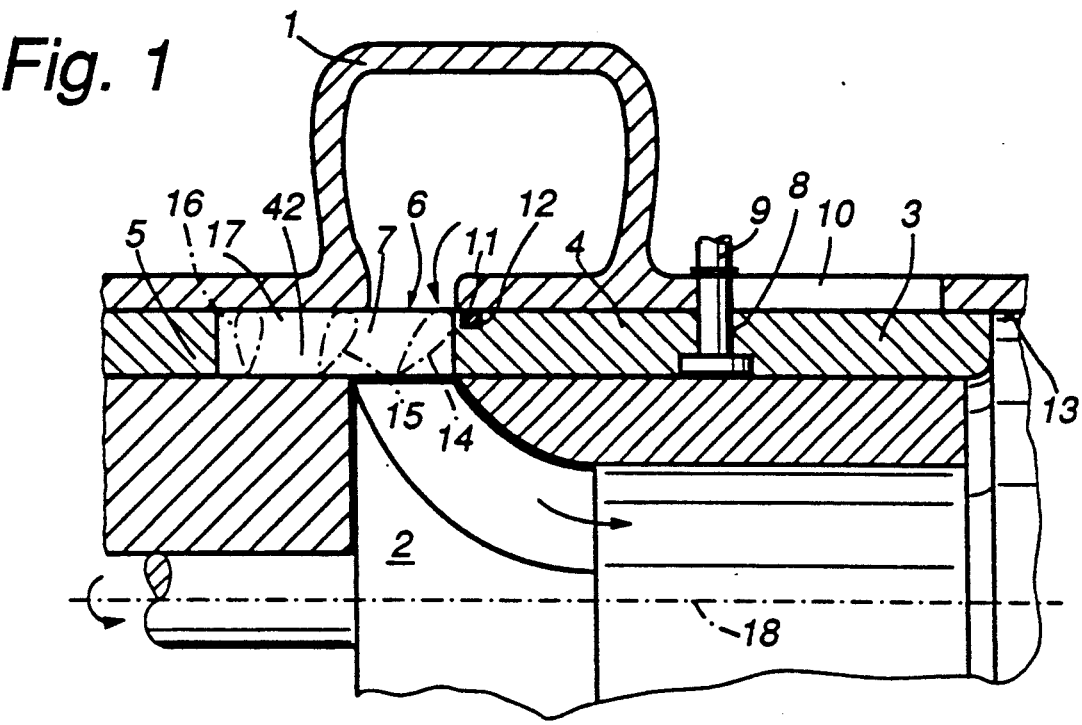
FIG. 1 is a partial sectional view along the axis of a rotor in a turbine casing including a flow control apparatus comprising an adjustable guide grid structure formed by a control sleeve.

FIG. 1 is a partial view along an axial cross-section of a turbomachine comprising a casing 1 with a rotor 2 (for example, an exhaust gas turbocharger) which is a component of an internal combustion engine (not shown). Between the casing 1 and the runner 2 there is disposed an annular control sleeve 3, which is movable axially along a longitudinal axis 18 of the runner and which consists of two tubular sleeve parts 4 and 5 and an annular insert in the form of a guide grid 6 having twisted guide vanes 7. Between the twisted guide vanes 7, twisted channels 42 are thus formed.

A bore 8, receiving a sliding pin 9 guided in a slideway 10, is provided in the tubular sleeve part 4. A linkage (FIG. 3) is connected to the sliding pin 9 and also to a hydraulic or pneumatic actuator communicating with the internal combustion engine. By means of this mechanism the control sleeve 3 is guided axially in a slot 13 and can be adjusted in dependence on operating conditions of the internal combustion engine.

The control sleeve 3 is sealed axially preferably by means of a ceramic seal ring 11, which is disposed in a groove 12 formed in the control sleeve 3. The use of wear-resistant materials (ceramics) eliminates the need for separate lubrication of the sliding surfaces.

The guide vanes 7 of the guide grid 6 have a relatively high twist adjacent the tubular sleeve part 4 (inwardly-turned profile 14). In the position of the control sleeve 3 as shown in FIG. 1 (for example, starting position of the internal combustion engine), in which the highly twisted part of the guide vanes 7 controls the flow to the rotor 2, a relatively low mass flow is accelerated by the relatively narrow flow cross-section between the vanes 7 and, with a highly radial flow to the rotor 2 resulting from the high twist of the guide vanes 7, a highly efficient operation of the rotor 2 (turbine) is achieved. As a result of such flow constriction steady full-load operation in the lowest engine speed range is also improved.

The twist of the vanes decreases continuously in the direction toward the tubular sleeve part 5 as indicated by the dash-dotted lines 14–16 indicating the profile and inclination of the vane 7 at the particular locations by a 90° turned representation of their cross-sections at those locations. In a portion 17 adjacent the tubular sleeve part 5 the guide vanes 7 of the guide grid 6 are no longer twisted. During full-load operation, the control sleeve 3 is displaced in such a manner that the portion 17 of the guide vanes 7 regulates the incoming flow (opening of the main flow). The main flow is so designed that no additional blow-off valve is needed and yet surging of the supercharger is avoided.

Figure 2:
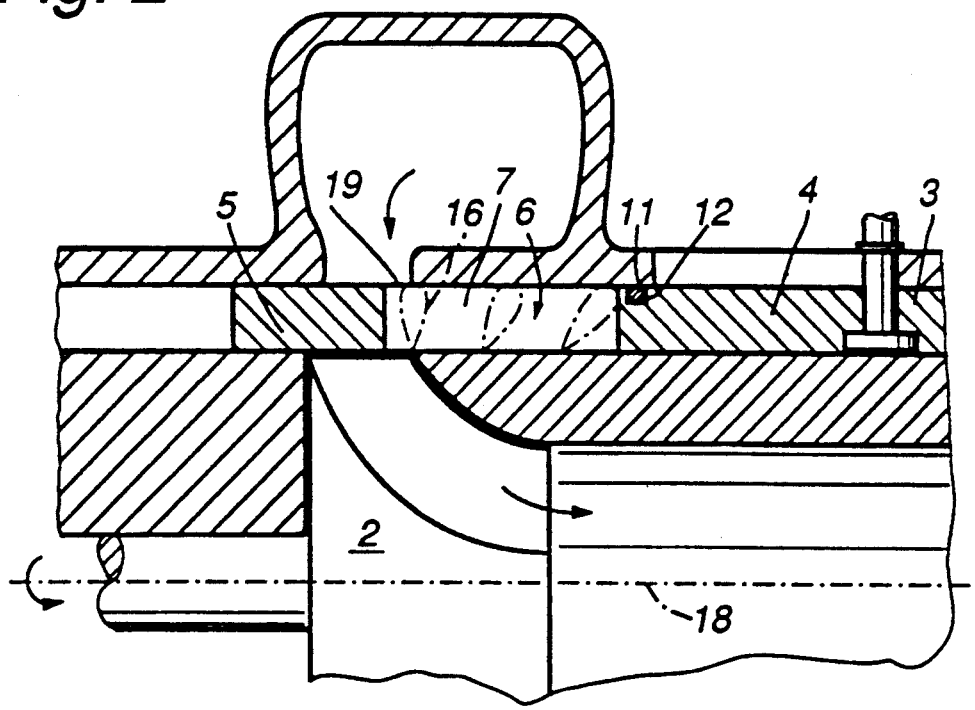
FIG. 2 shows the same arrangement as FIG. 1 wherein however the control sleeve with the guide grid is in its end position for engine braking operation.

FIG. 2 shows, in the same arrangement as FIG. 1, the control sleeve 3 with the two tubular sleeve parts 4 and 5 and the insert in the form of the guide grid 6 with twisted guide vanes 7 in a position for engine braking operation.

Through positioning of the control sleeve 3 in such a way that the tubular sleeve part 5 closes the inlet area of the rotor 2 to a large extent, surging of the rotor 2 can be prevented.

If the inlet area of the rotor 2 is sufficiently closed such that only a throttling cross-section 19 remains open, a back pressure is produced in the exhaust manifold of the internal combustion engine which can be used for engine brake operation.

Figure 3:
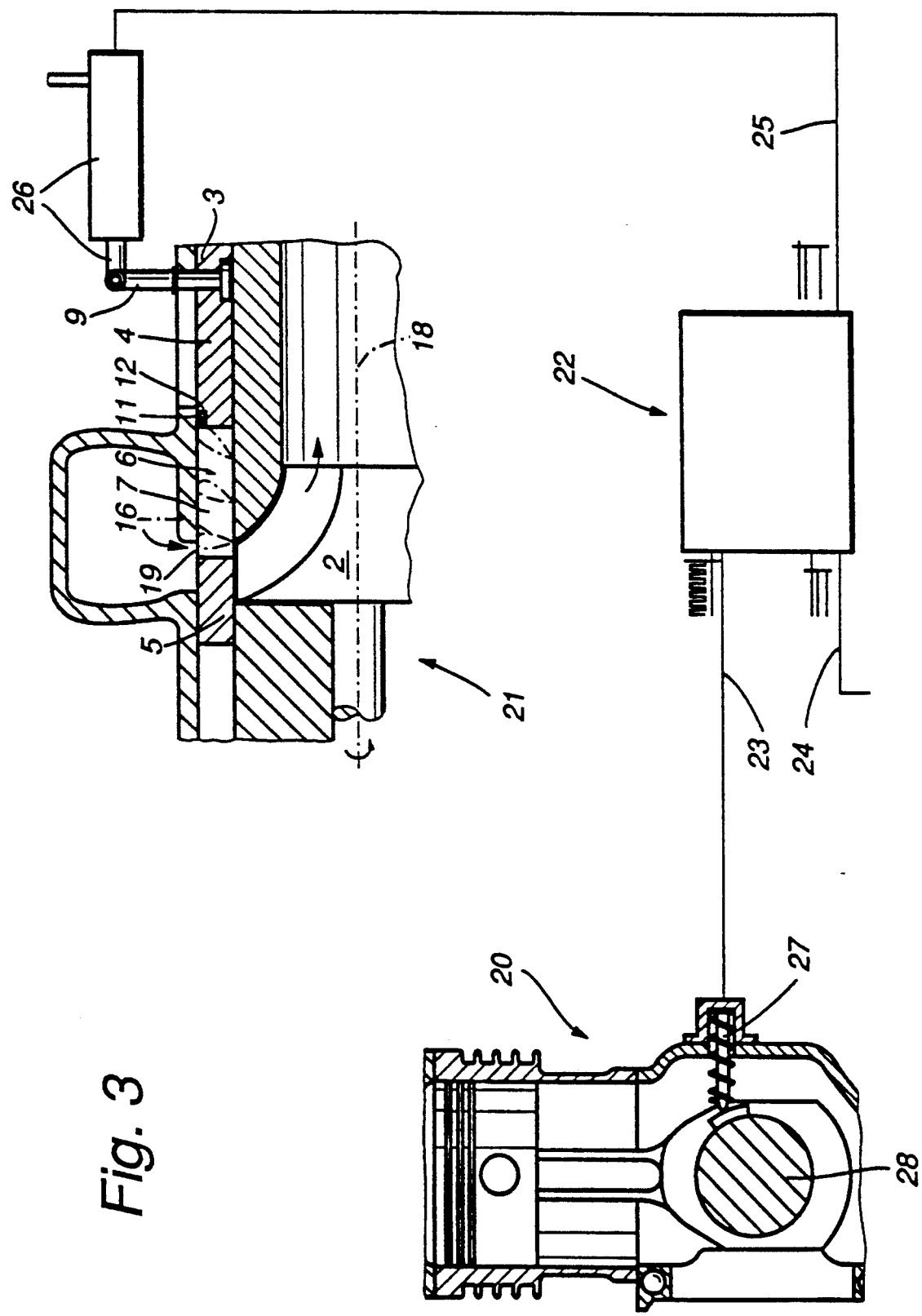
FIG. 3 shows schematically the essential elements for the operation of an internal combustion engine with engine speed dependent control of a brake gap provided by the control sleeve.

An engine 20 and a part of an exhaust gas turbocharger 21, which are connected to a control unit 22, are shown schematically in FIG. 3.

In dependence on engine speed and the operation of a brake button by which the driver operates the motor brake of his motor vehicle, the control unit 22 controls the position of the control sleeve 3 and hence the cross-section of the brake gap (throttle cross-section 19).

The input signals 23 and 24 of the control unit 22 are the engine speed signal and the brake button operation signal. The output signal 25 is a control signal which controls an actuator 26 connected to the sliding pin 9 of the control sleeve 3.

The engine speed is obtained from a signal transmitter 27, which inductively detects the revolutions of an engine crankshaft 28 and converts the rpm signal into an oscillating analog signal. The input signal from the operation of the brake button is essentially a constant threshold signal having only two signal states: "on" and "off".

The output signal 25 resulting from the input signals 23 and 24 depends on the control algorithm of the control unit 22. An appropriate control algorithm is designed such that, at maximum engine speed, the inlet flow cross-section is closed to such a degree that the exhaust valves are not overloaded by excessively high closing speed or by being pushed too far in opening direction toward the piston, and that, at low engine speeds, the brake gap is so adjusted as to achieve optimum braking energy.

Figure 4:
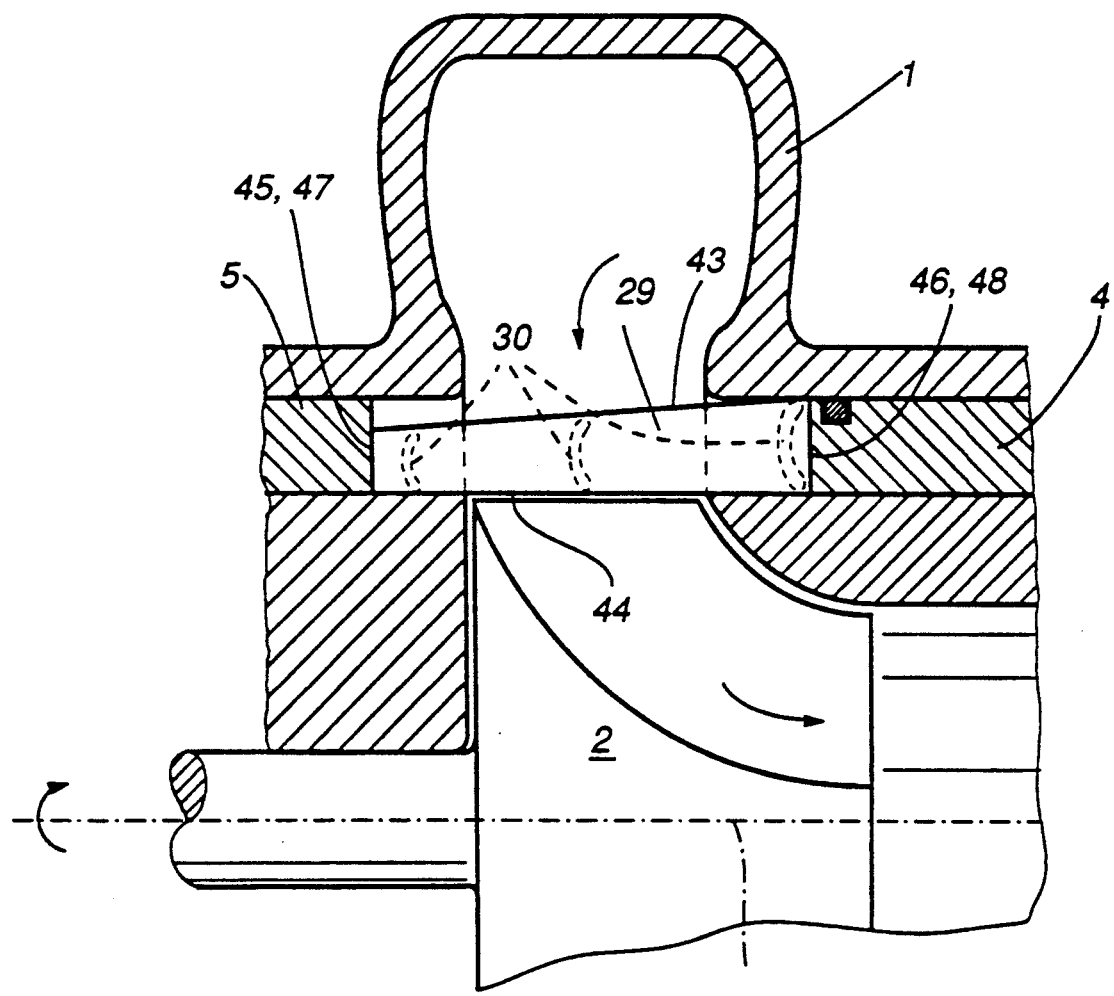
FIG. 4 shows a control sleeve with trapezoidal guide vanes.

FIG. 4 shows a partial axial cross-section of the flow guide apparatus provided with trapezoidal vanes 29, which are fastened to the tubular sleeve parts 4 and 5. The vane 29 is bounded by an inclined vane edge 43, a straight vane end 44, a vane tip 47 having a profile chord 45, and a vane root 48 having a profile chord 46. The vane 29 has no profiling and the median line of the vane 29 is curved approximately in the form of a circular arc. For each vane 29, a circular arc profile 30, which is shown by dashed lines in the drawing, is thus obtained.

FIG. 5 shows another exemplary embodiment of the flow guide apparatus provided with a tubular control sleeve 31. The control sleeve 31 has a plurality of rows of holes 32, 33 and 34 disposed axially one behind the other. On the left of the row of holes 32 there is a brake gap 35 provided with an oblique control edge 36, which is shown in a position of the control sleeve 31 for engine braking operation.

The brake gap 35 is formed by an elongated cutout defined by two section planes one of which extends parallel and the other extends at a slight inclination with respect to a plane normal to the rotor axis. The cutout is positioned such that the resulting gap in the periphery of the control sleeve 31 includes the greater part of the peripheral surface. The position of the brake gap 35 is located such that, on movement of the control sleeve 31 to the right to stop 37, the inlet flow cross-sect ion of the flow guide apparatus is equal to a minimum throttle cross-section 38 of the internal combustion engine.

The rows of holes 32, 33 and 34 consist of holes 39, 40 and 41 uniformly distributed over the periphery of the control sleeve 31, with their center lines inclined relative to the radial direction of the control sleeve. The inclination of the center lines of the holes 39, 40 and 41 increases from the row 32 to the row 34, so that those holes whose center lines are least inclined are in row 32 (see FIG. 6), which corresponds to a main flow opening. In row 34 the holes 41 have a relatively great inclination (see FIG. 7) in relation to the radial direction of the control sleeve 31 (starting flow opening).

FIG. 6 shows a partial cross-section of FIG. 5, taken along a plane extending normal to the axis of the flow guide apparatus and through the row of holes 32 comprising the holes 39 with a relatively slight inclination in relation to the radial direction.

FIG. 7 shows a partial cross-section of FIG. 5, taken along a plane extending normal to the axis of the flow guide apparatus and through the row of holes 34 comprising the holes 41 having a relatively great inclination in relation to the radial direction.

In a further embodiment of the invention a flow guide apparatus having flow guide devices in the form of a guide grid is provided wherein the grid consists of two or more guide grid structures disposed axially adjacent one another. The guide vanes of these guide grids may have different inclinations in relation to a meridian plane or they may be twisted.

In addition, the trapezoidal vanes may also be profiled and/or have a twist. In the case of trapezoidal vanes having a profile in the shape of a circular arc it is possible, in a particular embodiment, to use two-part vanes with fixed and displaceable parts which are movable relative to one another in the direction of displacement of the control sleeve.

Furthermore, the flow guide apparatus according to the invention can also be used in dual-flow and multi-flow turbomachines. In this case, it is only necessary for the shape and dimensions of the ducts in the flow guide apparatus to be adjusted to the desired control behavior and to the flows of the turbomachine.

In a particular embodiment of the control unit according to the invention a continuous or stepped input signal may also be produced by the brake button instead of the constant threshold signal of the brake button. In this way the output signal and hence the engine braking action can be controlled not only in dependence on engine speed, but also directly by the driver for a more gradual control.

What is claimed is:

1. A flow control apparatus of an exhaust gas turbocharger turbine for an internal combustion engine including a turbine casing receiving a turbine rotor and having a spiral guide channel arranged around said turbine rotor with a mouth area defining an inlet flow cross-section for directing said exhaust gas from said spiral guide channel to said turbine rotor, a control sleeve disposed between said spiral guide channel and said rotor and including a flow guide section with flow guide passages distributed over its circumference and each of said flow guide passages having flow guide characteristics which vary with their axial location on the control sleeve, said control sleeve being axially movable for changing the position of said flow guide passages relative to said mouth area for controlling the exhaust gas flow characteristics to said rotor and further having an integral annular end section directly adjacent the flow guide section for blocking the exhaust gas flow to form a flow-throttling cross-section at said mouth area providing a brake gap for engine brake operation.

2. A flow control apparatus according to claim 1, wherein said flow-throttling cross-section of the brake gap is adjustable in dependence on operating parameters of the internal combustion engine.

3. A flow control apparatus according to claim 1, wherein said flow guide passages are formed by at least one guide vane ring having twisted axial guide vanes.

4. A flow control apparatus according to claim 3, wherein the radial profile length of the guide vanes varies continuously in the axial direction of the control sleeve in such a manner that the projection of a vane as defined by the circumference of a vane has approximately the contour of a trapezium.

5. A flow control apparatus according to claim 3, wherein said guide vanes have no profiling and the median line of the guide vanes is curved approximately in the shape of a circular arc.

6. A flow control apparatus according to claim 5, wherein said guide vanes consist of a fixed part which is integrated in the casing, and of a displaceable part which is part of the control sleeve.

7. A flow control apparatus according to claim 1, wherein said flow passages consist of holes distributed over the periphery of said control sleeve with an inclination of their center lines in relation to the radial direction of the control sleeve which varies depending on the axial location of the passages.

8. A flow control apparatus according to claim 7, wherein said control sleeve is provided on its periphery with at least one oblique control edge.

9. A flow control apparatus according to claim 1, wherein the control sleeve is hydraulically controllable.

10. A flow control apparatus according to claim 1, wherein said control sleeve apparatus is provided on its periphery with at least one oblique control edge.

* * * * *